United States Patent
Neeley

(10) Patent No.: US 9,027,434 B2
(45) Date of Patent: May 12, 2015

(54) TWO POSITION CONTROL DEVICE

(75) Inventor: Eric Neeley, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 241 days.

(21) Appl. No.: 13/549,812

(22) Filed: Jul. 16, 2012

(65) Prior Publication Data

US 2014/0013875 A1   Jan. 16, 2014

(51) Int. Cl.
*F16C 1/12* (2006.01)
*B62K 23/02* (2006.01)

(52) U.S. Cl.
CPC .. *F16C 1/12* (2013.01); *B62K 23/02* (2013.01)

(58) Field of Classification Search
CPC .................................. B62K 23/02; B62K 25/08
USPC ............... 74/501.6, 543, 501.5 R; 403/409.1; 211/20; 280/276
See application file for complete search history.

(56) References Cited

U.S. PATENT DOCUMENTS

| | | | | |
|---|---|---|---|---|
| 5,275,187 A | * | 1/1994 | Davis | 135/67 |
| 5,277,080 A | * | 1/1994 | Roelle | 74/501.5 R |
| 6,095,309 A | | 8/2000 | Mione | |
| 6,442,797 B1 | * | 9/2002 | Yang et al. | 16/113.1 |
| 6,536,302 B1 | * | 3/2003 | Tame | 74/543 |
| 6,767,024 B1 | * | 7/2004 | Kuo | 280/276 |
| 7,007,568 B2 | * | 3/2006 | MacAulay et al. | 74/501.6 |
| 7,735,843 B2 | * | 6/2010 | Dotsey et al. | 280/47.38 |
| 7,806,022 B2 | | 10/2010 | Shimano | |
| 8,181,553 B2 | | 5/2012 | Shimano | |
| 8,539,857 B2 | | 9/2013 | Chen | |
| 8,621,956 B2 | * | 1/2014 | Simeonidis et al. | 74/501.6 |
| 2002/0035884 A1 | * | 3/2002 | Wessel et al. | 74/501.6 |
| 2004/0005948 A1 | | 1/2004 | Shimano | |
| 2008/0237155 A1 | * | 10/2008 | Forest et al. | 211/20 |
| 2009/0324327 A1 | * | 12/2009 | McAndrews et al. | 403/409.1 |
| 2010/0059964 A1 | | 3/2010 | Morris | |
| 2013/0119634 A1 | * | 5/2013 | Camp et al. | 280/287 |

FOREIGN PATENT DOCUMENTS

EP         1129937         6/2009

* cited by examiner

*Primary Examiner* — Vinh Luong
(74) *Attorney, Agent, or Firm* — Milan Milosevic; Lisa Serdynski

(57) ABSTRACT

An actuator for pulling and releasing a bicycle control cable, including an actuator body including a hollow interior. A plunger is disposed in the hollow interior and is axially movable. The plunger includes at least one driving lug and at least one latching lug. A latching ring is rotatably disposed in the hollow interior, the rotation of which by the plunger lugs creates a cable pull and a cable release state of the actuator.

18 Claims, 11 Drawing Sheets

“TWO POSITION CONTROL DEVICE”

BACKGROUND OF THE INVENTION

The invention relates to bicycle controls, and more particularly, to a bicycle control for controlling the state of a bicycle part or system, such as a suspension part or system.

"Mountain biking" is a relatively new bicycling sport where enthusiasts experience riding on off road and mountain trails. Bicycles specifically designed for that terrain, often called "mountain bikes," while individually diverse, typically have some universal commonalities, namely some sort of a suspension system for addressing the often rough terrain over which the bicycle is designed to travel.

In addition to the bicycle frame, wheels, and tires, which tend to provide some suspension functionality, the ride performance of a mountain bike also may rely on one or more of three types of active suspension systems: a front wheel suspension system, a rear wheel suspension system, and more recently, a seat post suspension or seat post adjustable ride height system. Historically, when a rider wanted to change the functionality of any of the suspension systems, the rider might reach down and twist a knob located on a component of the front suspension system and/or the rear suspension system. Of course, it is impractical while riding to reach to a control located on the bicycle fork or rear frame component. Other means of adjusting suspension components might have involved adjusting the component with a tool while dismounted from the bicycle while the bicycle is at rest.

To mitigate the effort and amount of time spent altering the state of the suspension; the invention permits the relocation of a suspension control device to a handlebar of the bicycle where it is easily and safely operated.

BRIEF SUMMARY OF THE INVENTION

In light of the present need for an improved control for a bicycle, such as for a bicycle suspension component or device, a brief summary of an exemplary embodiment is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections, but it should be understood that minor variations of these concepts are contemplated by the invention.

An actuator for pulling and releasing a bicycle control cable, is provided, including an actuator body including a hollow interior. A plunger is disposed in the hollow interior and is axially movable. The plunger includes at least one driving lug and at least one latching lug. A latching ring is rotatably disposed in the hollow interior, the rotation of which by the plunger lugs creates a cable pull and a cable release state of the actuator.

These and other features and advantages of the present invention will be more fully understood from the following description of one or more embodiments of the invention, taken together with the accompanying drawings.

DETAILED DESCRIPTION OF THE INVENTION

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "upper" and "lower," or "left" and "right" are used for the sake of clarity and not as terms of limitation. Moreover, the terms refer to bicycle mechanisms conventionally mounted to a bicycle and with the bicycle oriented and used in a standard fashion unless otherwise indicated. It will also be understood that the control 20 disclosed herein may be used with systems other than suspension systems.

Figure 1:
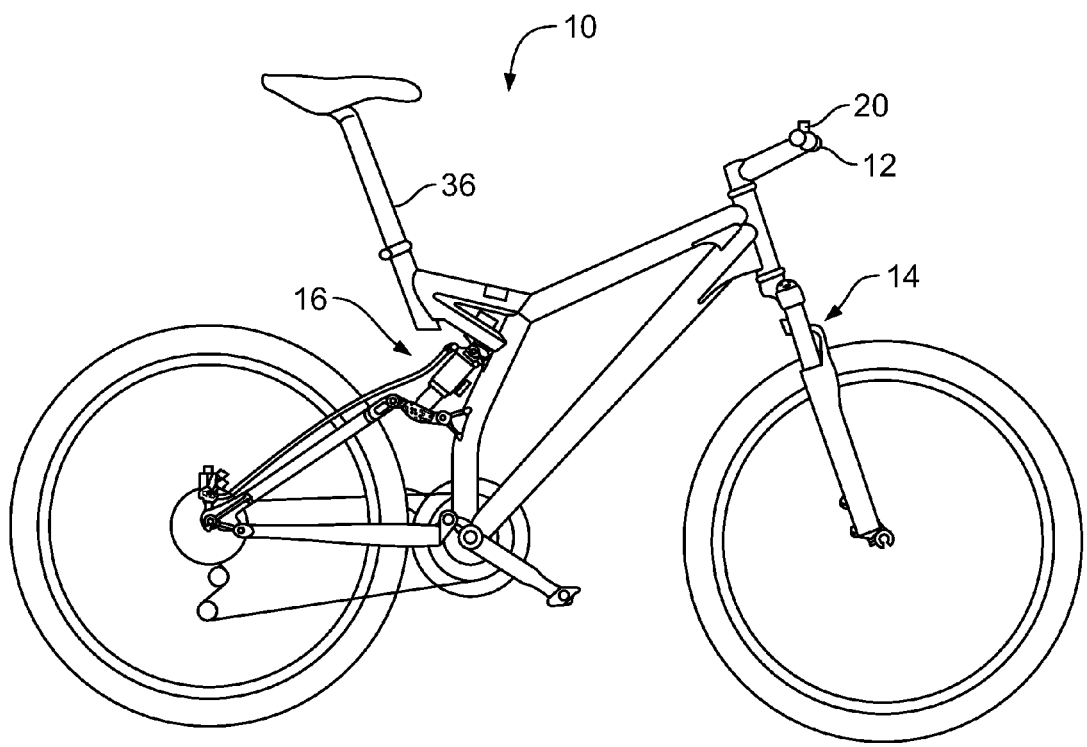
FIG. 1 is a bicycle with various suspension systems and an actuator for one or more of the various systems.

FIG. 1 shows an actuator 20 on a handlebar 12 of a bicycle 10. The bicycle 10, in the illustrated embodiment, may include a front suspension system 14, in the form of a suspension fork attached to a front of the bicycle; a rear suspension system 16, in the form of a pivoting swing arm and a spring/damper unit attached at a rear of the bicycle; and a seat post system 36 attached near the top of the bicycle, which may be a suspension seat post or an adjustable ride height seat post, for example. It will be understood that the present invention contemplates operating any or all of the front, rear and seat post systems (14, 16, and 36) with one or more actuator 20 according to embodiments of the invention. The handlebar 12 may include various other controls for shifting gears of the bicycle 10, and the application of brakes and so on, as is well known.

Figure 2:
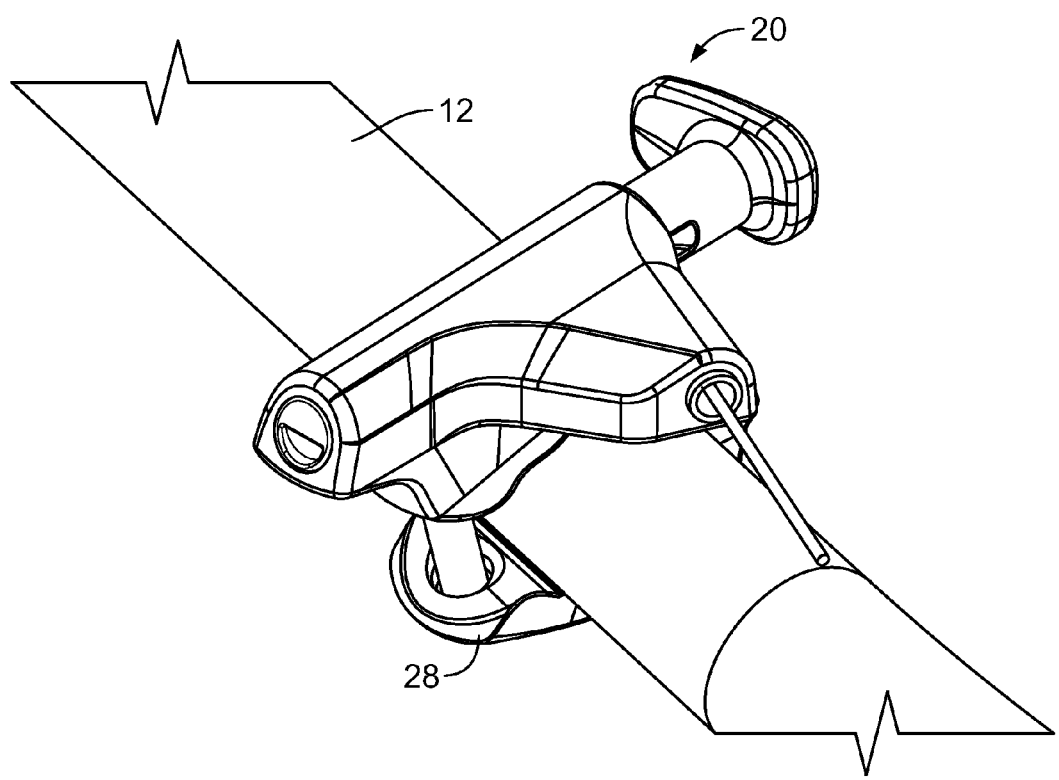
FIG. 2 is a handlebar of the bicycle with an embodiment of the actuator attached thereto.

FIG. 2 is the handlebar 12 of the bicycle 10 with an actuator 20 mounted thereto. In the illustrated embodiment, the actuator 20 is attached to the handlebar by way of a clamp 28, but the actuator may be attached directly to another control or component of the bicycle as well, such as a clamp for a brake lever or the like.

Figure 3:
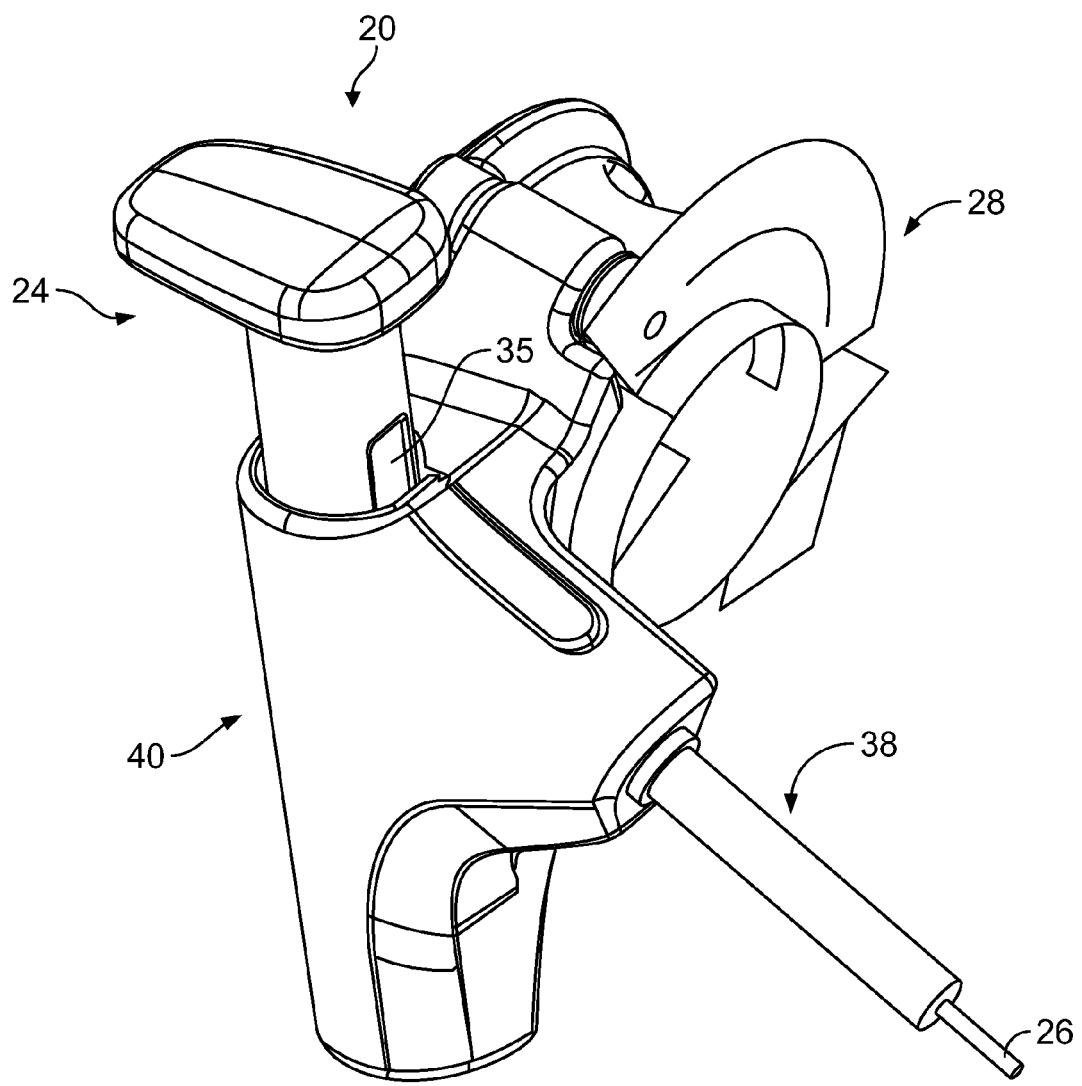
FIG. 3 is a perspective view of an actuator according to the invention.
Figure 6:
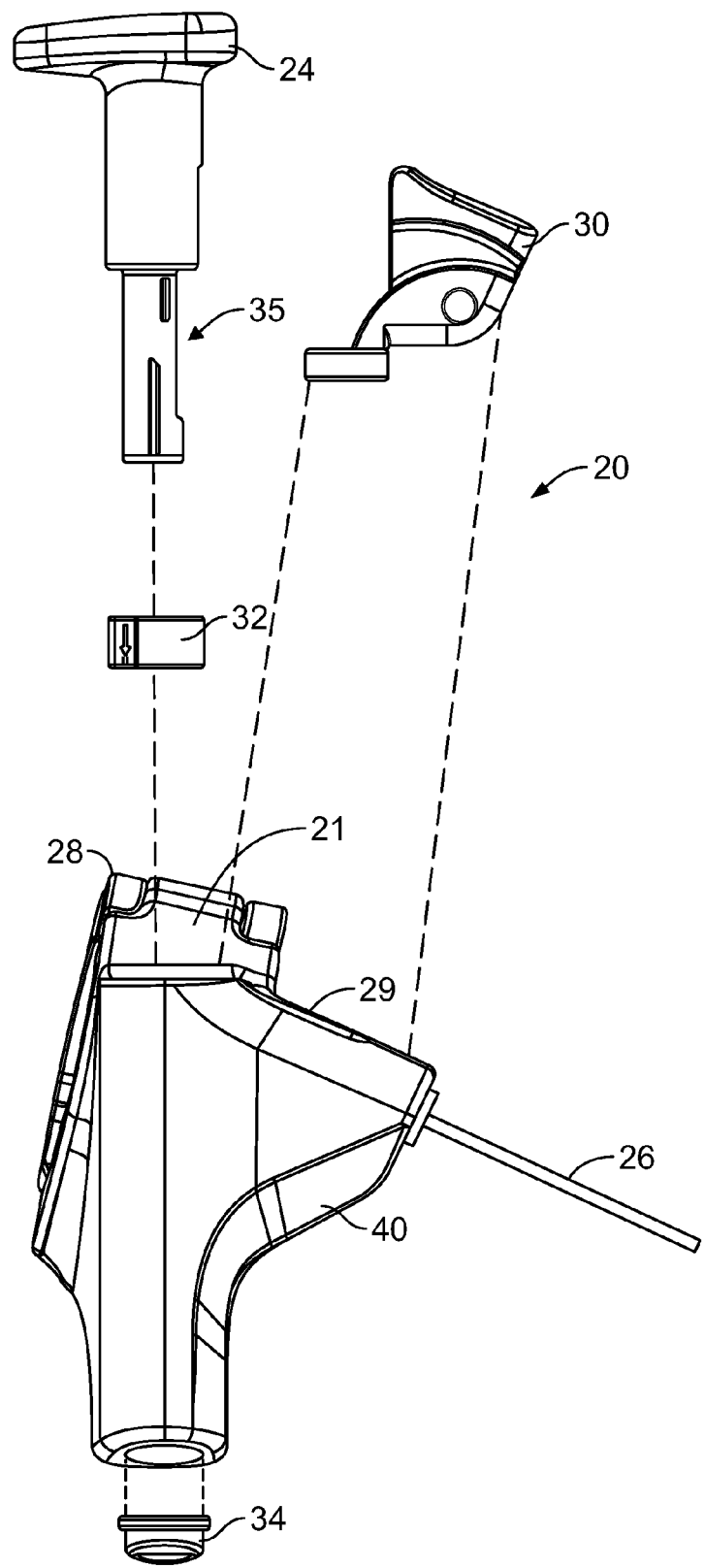
FIG. 6 is an exploded view of the actuator of FIG. 3.

FIGS. 3 and 6 show an actuator 20 according to the invention. The actuator 20 includes an actuator body 40 in which the device components are housed or to which the device components are attached. A mount 28, such as a clamp or any suitable fastening technique, functions to attach the actuator body 40 to a handlebar 12 or any suitable attachment point of the bicycle 10. The actuator 20 includes a plunger 24, which is the interface used by a rider to operate the actuator. The plunger 24 may have two positions, an extended or first position, wherein cable is not pulled and a non-extended or second position, wherein cable is pulled to operate an attached suspension component or a device with a similar control requirement. Body 40 receives the cable housing 30 in a housing slot 29 thereof. The interior 21 of the actuator body 40 receives the plunger 24 and the latching ring 32 and is closed with cap 34. The cable 26 is routed into the cable housing 30 and the slot 35 of the plunger 24.

Figure 4:
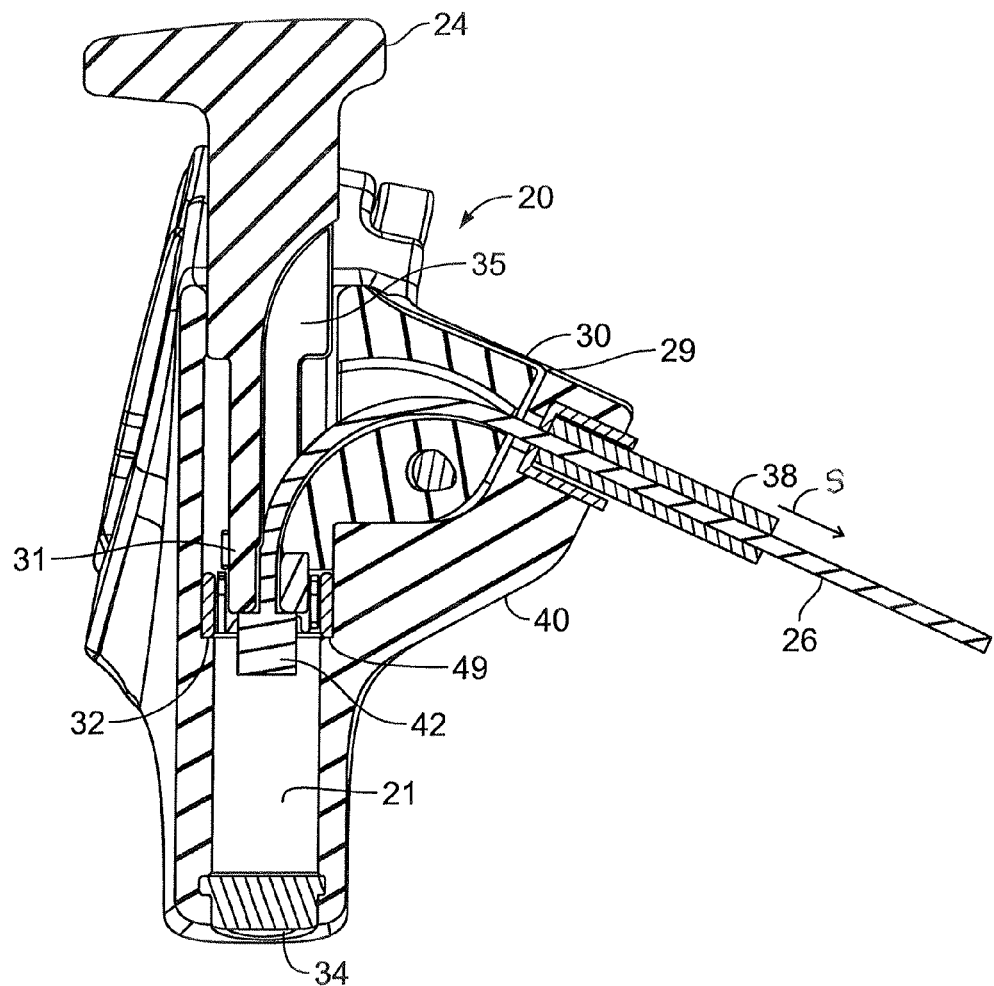
FIG. 4 is a cross-sectional view of the actuator of FIG. 3 in a state or position wherein cable is released.
Figure 5:
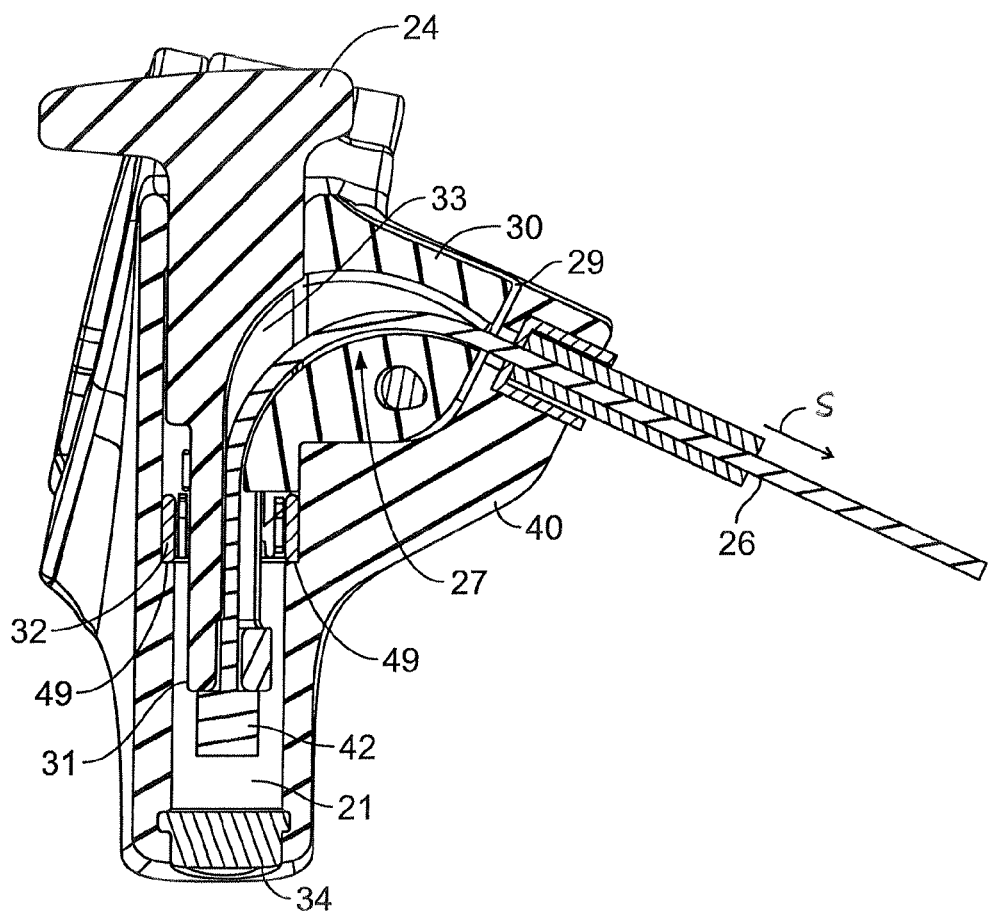
FIG. 5 is a cross-sectional view of the actuator of FIG. 3 in a state or position wherein cable is pulled.

FIGS. 4 and 5 show an embodiment of the actuator 20 in cross-section. The actuator body 40 slot 29 receives cable housing 30 that orients the cable 26 with the control device 20. The cable housing 30 may be part of or attached to the actuator body 40. The body 40 has a hollow interior 21. A cable 26 extends along or through the cable housing 30 and into the interior 21. The cable 26 includes a cable cap 42 which engages the plunger 24 and permits the plunger to pull or release cable by acting on the cable cap. The cable 26 may also have a cable sleeve 38 as is well known.

The actuator body 40 may have a cable stopper 34 to permit access to and for closing the interior 21. During assembly of cable to the device 20, cable 26 is inserted into the interior 21 of the actuator body 40 and engaged with the plunger 24. Then the cable stopper 34 may be used to close the body 40.

A latching ring 32 is positioned within the interior 21 and may be concentrically disposed about a distal end 31 of the plunger 24. The interaction of the plunger 24 and latching ring 32 provides the cable pull and cable release functionality of the actuator 20.

Figure 7:
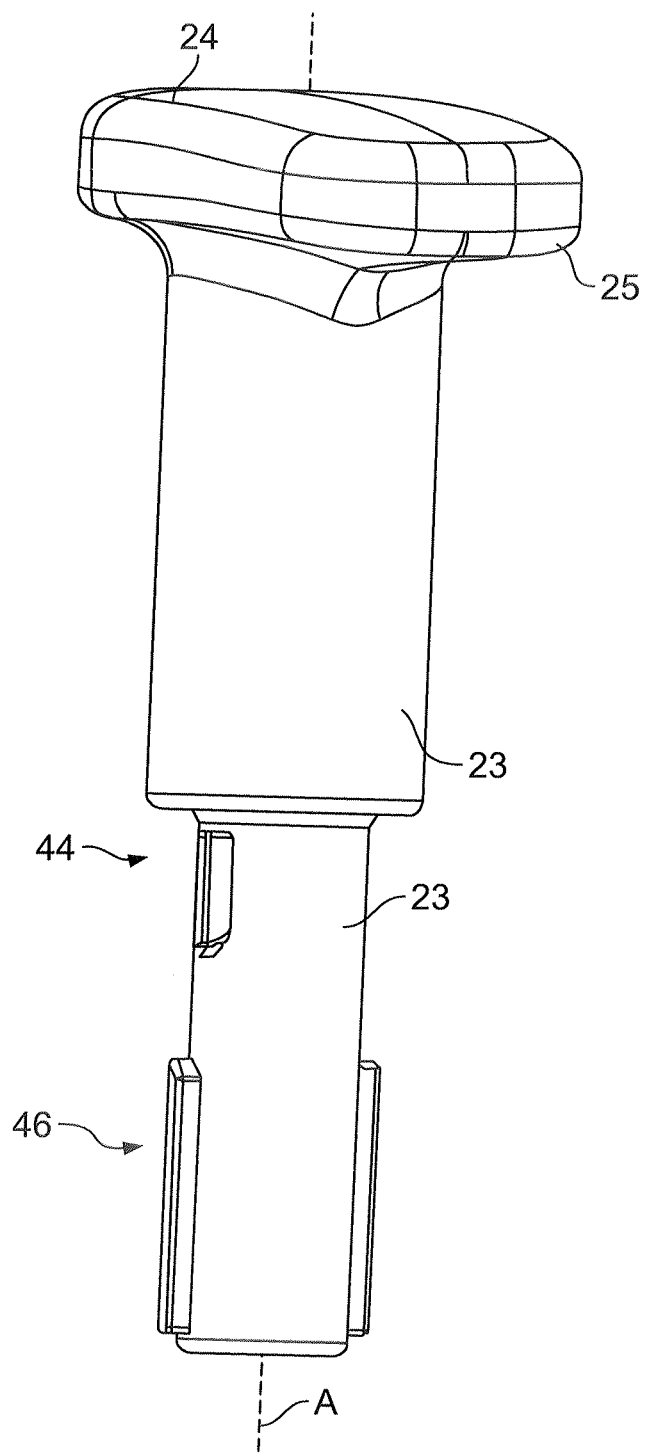
FIG. 7 is a side view of the plunger part of the actuator of FIG. 3.

FIG. 7 is a side view of the plunger 24. The plunger 24 has a generally cylindrical shaft 23 including two sets of lugs or extensions 44, 46 in the general shape of ridges or fins which extend outwardly from the sides of the plunger shaft and have a longitudinal axial extent that is generally parallel to the axis A of the shaft. The lugs 44, 46 are sized, shaped and positioned on the shaft 23 so as to cooperatively engage with the latching ring 32 to operate the actuator 20 and ultimately effect desirable changes in operation of the suspension system to which the actuator is attached.

The plunger 24 includes a button part 25 or the like that is sized and shaped for user contact. When depressed, the plunger 24 forces the cap 42 of the cable 26 in a direction to pull cable. The cable 26 is routed through the actuator body 40 by the cable housing 30. In particular, the cable housing 30 may have a convex surface or curved part 27 that guides the cable 26 into the interior 21 (FIG. 5).

Figure 8:
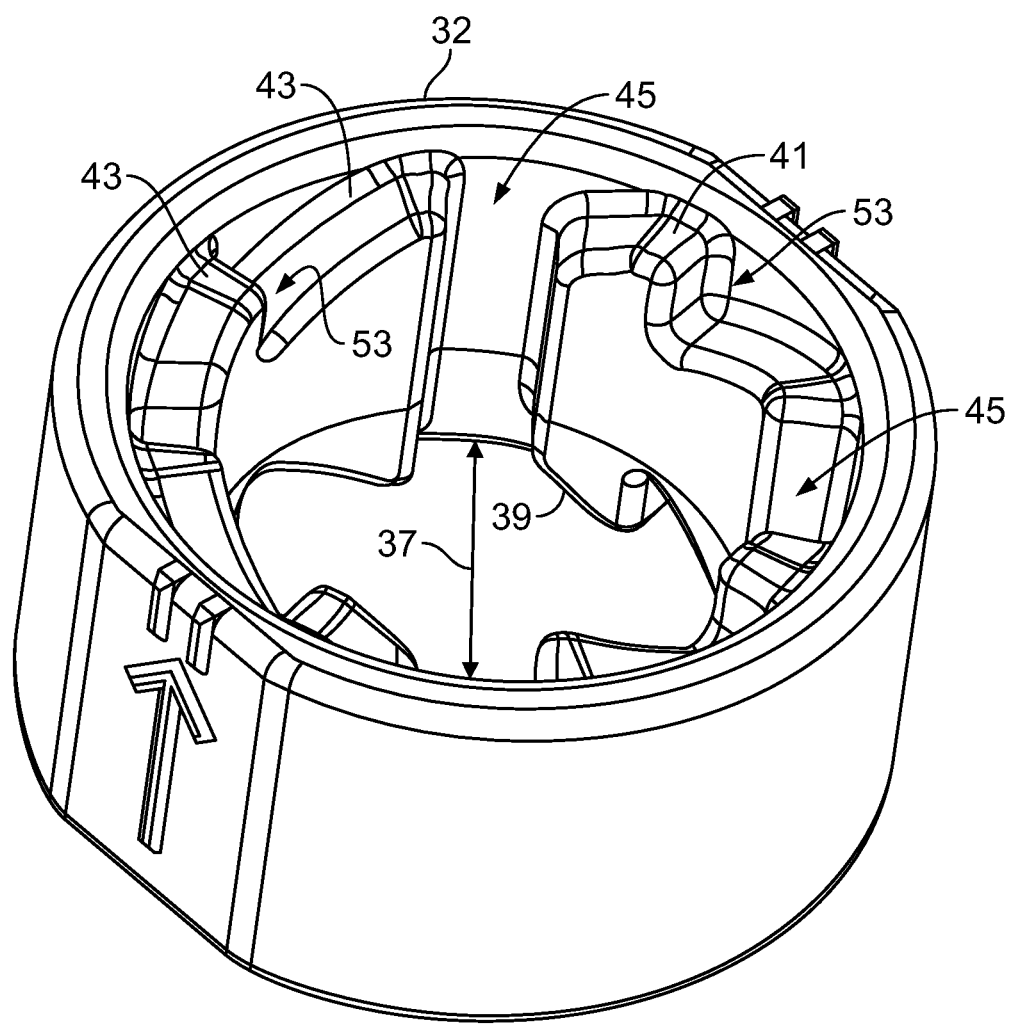
FIG. 8 is a perspective bottom view of the latching ring part, which interacts with the plunger of FIG. 7.

As noted above, the plunger 24 includes a driving set of lugs 44 and a latching set of lugs 46, a hollow center 33, and an axial slot 35. The latching ring 32, in this embodiment, has a center bore 37 that fits concentrically around the shaft 23 of the plunger 24. The latching ring 32 (FIG. 8) includes a first set of gear teeth 39 formed at or near the top of the center bore 37 and a second set of gear teeth 41 formed at or near the bottom of the center bore. Each of the first and second set of gear teeth 39, 41 includes a plurality of gear teeth 43.

In the present embodiment, every other of the gear teeth 43 is interrupted by an axial slot 45. There may be four such axial slots 45. It will be understood that other configurations of teeth and slots are contemplated by the invention such that two positions of the plunger 24 of the device 20 are provided, which provides two conditions or states of the cable 26 (e.g., pulled and released).

Figure 9:
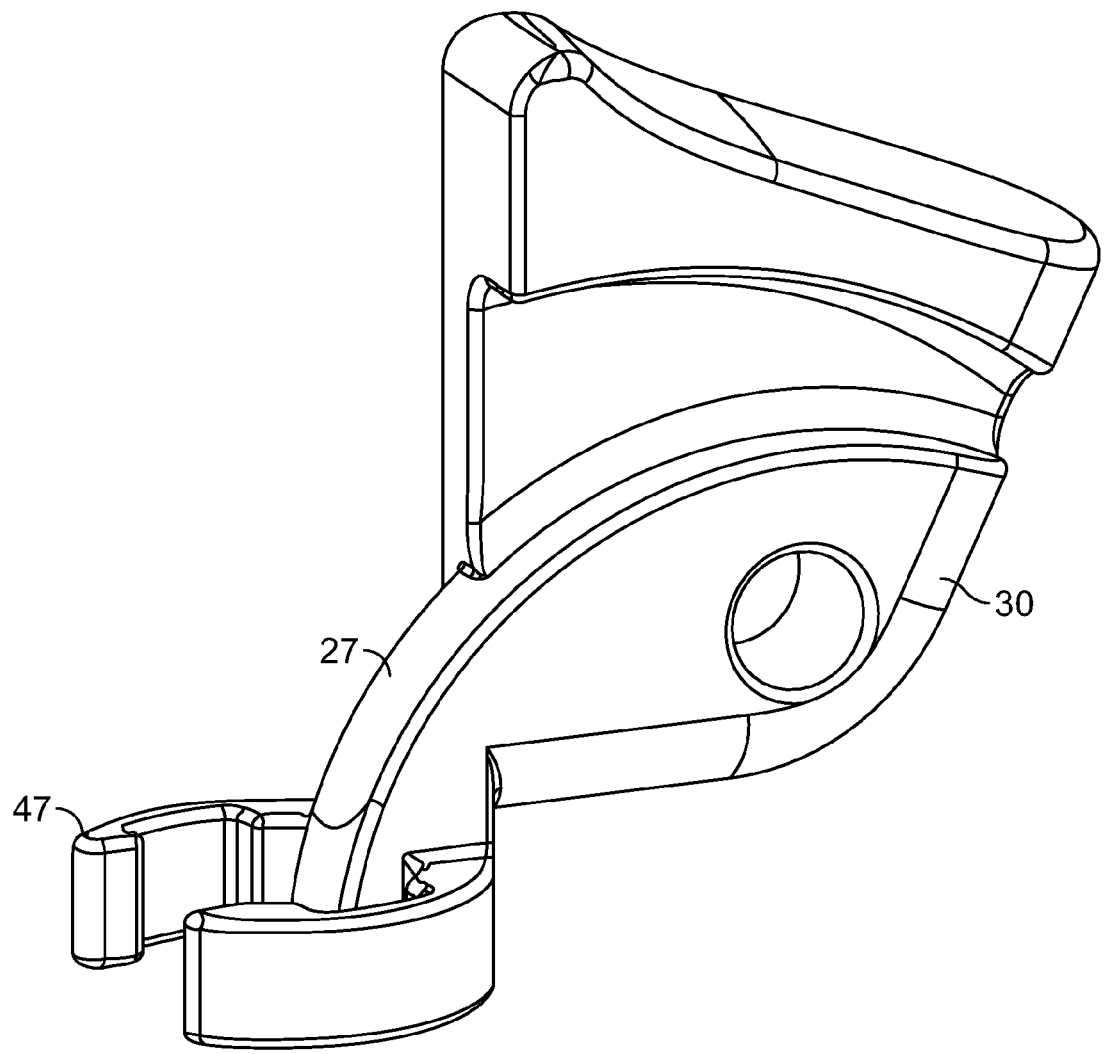
FIG. 9 is a perspective view of the cable housing part of the actuator of FIG. 3.

The plunger 24 moves axially within the body 40. The slot 35 in the plunger is used to key the plunger to the cable housing 30 in order to prevent the plunger from rotating relative to the body 40. The latching ring 32 may be installed concentrically around the distal end 31 of the shaft 23 of the plunger 24 and is free to rotate about the plunger axis A. Axial translation of the latching ring 32 is constrained by a holder 47 part (FIG. 9) of the cable guide 30 and a ledge 49 formed in the interior 21 of the body 40.

Figure 10:
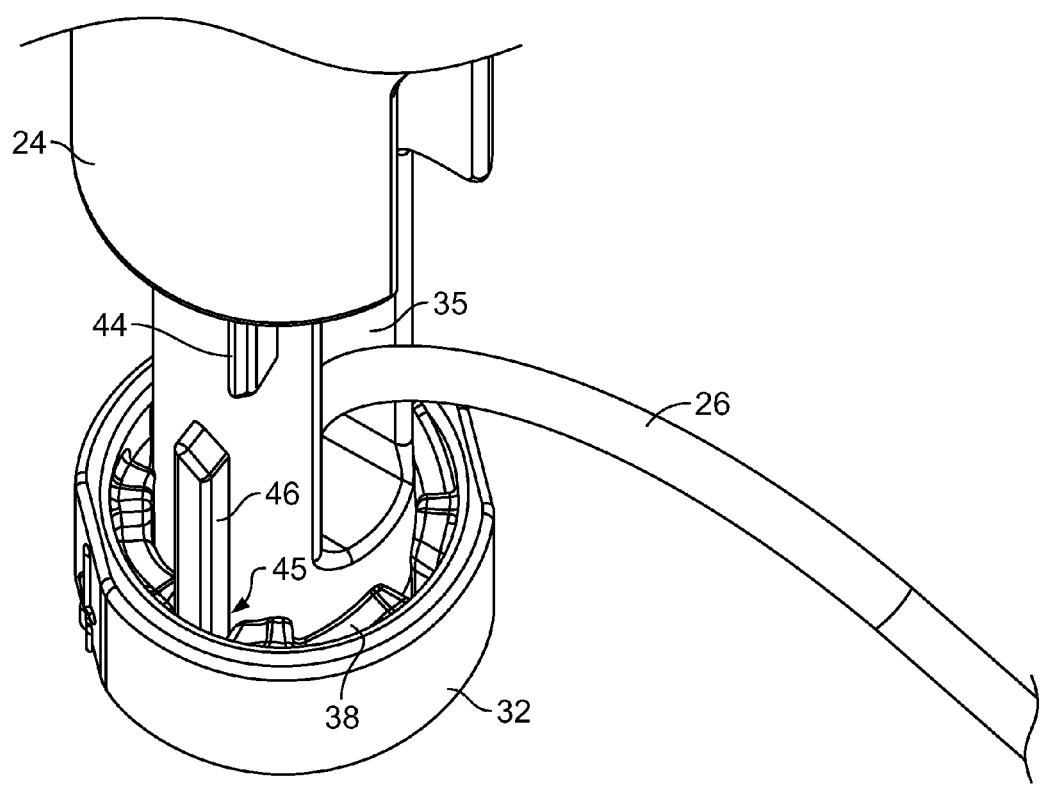
FIG. 10 is a top perspective view showing cooperation of the plunger and latching ring parts.
Figure 11:
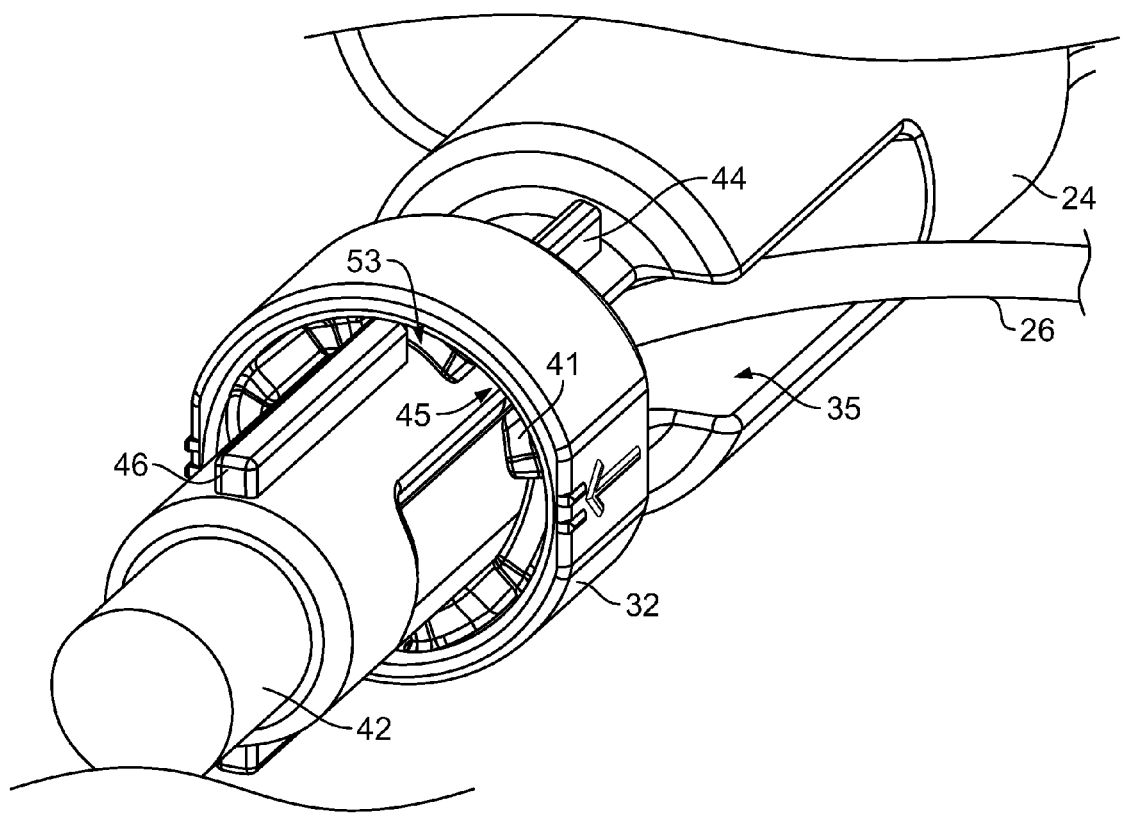
FIG. 11 is a bottom perspective view showing cooperation of the plunger and latching ring parts.

In use, and referring to the figures, when the plunger 24 is fully extended from the body 40, the upper set of lugs 44 (the driving set) is positioned above the latching ring 32 (oriented as in FIG. 10) and the lower set of lugs 46 (the latching set) is keyed to the slots 45 passing through the latching ring. As the plunger 24 is depressed axially into the body 40, the latching lugs 46 slide out of the latching ring slot(s) 45 and the driving set of lugs 44 engages the first set of gear teeth 39 of the latching ring 32 which causes the latching ring to rotate a first amount of approximately 35 degrees around the axis A of the plunger. As the plunger 24 extends out of the body 40, the latching set of lugs 46 engage the bottom or second set of gear teeth 41 of the latching ring 32, which rotates the latching ring a second amount of an additional approximately 10 degrees, aligning the latching lugs 46 with a holding feature or land 53 in the second set of gear teeth 41. The engagement between the latching lugs 46 and the land 53 of the second set of gear teeth 41 locks the plunger 24 in this second or cable-pulling position (FIGS. 5 and 11). When the plunger 24 is depressed again, the driver lugs 44 engage the gear teeth 41 on the latching ring 32, which rotates the latching ring approximately 35 degrees again. As the plunger 24 extends, the latching lugs 46 engage the second set of gear teeth 41 of the latching ring 32 rotating it an additional 10 degrees. In this position, the latching lugs 46 are realigned with the slots 45 formed in the latching ring 32, which allows the plunger 24 to fully extend to its initial position, which corresponds to the first or cable-releasing position (FIGS. 4 and 10). Thus, the actuator 20 provides two positions that correspond to respective cable release and pull positions. It will also be understood that the exact amount of rotation may be made other amounts for the various interactions of the plunger 24 and ring 32.

In the current design, tension motion in the direction S of the cable 26 to return the plunger 24 to the fully extended position may be provided by a return spring in the component to which the cable is attached (see FIGS. 4 and 5). In the alternative, a return spring could easily be placed inside the device 20 to provide a return force without the necessity of an externally attached component.

The majority of the device 20 may be made of plastic, with any fasteners and cable 26 being preferably made of a type of metal or a relatively higher strength material. The cable sleeve 38 and the stopper 34 may both be made of a type of plastic and/or rubber. The invention is intended for use on a bicycle, where a rider desires a convenient and effective means to lock and unlock a suspension component, for example.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. An actuator for pulling and releasing a bicycle control cable, comprising:
   an actuator body including a hollow interior;
   a cable housing so dimensioned and shaped to receive the bicycle control cable;
   a plunger disposed in part in the hollow interior and configured to move axially between a cable pull position and a cable release position, the plunger including at least one driving lug and at least one latching lug thereon; and
   a latching ring rotatably disposed in the hollow interior, the latching ring including:

a plurality of gear teeth positioned to engage the at least one driving lug and the at least one latching lug; and a plurality of slots axially formed through the plurality of gear teeth;

wherein the cable release position is produced when the latching ring is rotated by the plunger by engaging the plurality of gear teeth with the at least one driving lug and then at least one latching lug to align the at least one latching lug with one of the plurality of slots, and the cable pull position is produced when the latching ring is rotated by the plunger by engaging the plurality of gear teeth with the at least one driving lug and then at least one latching lug to hold the at least one latching lug with the plurality of gear teeth.

2. The actuator of claim 1, wherein each of the plurality of slots is spaced apart from an adjacent one of the plurality of slots by a pair of the plurality of gear teeth.

3. The actuator of claim 1, wherein the plurality of gear teeth includes:

a plurality of first gear teeth positioned to engage the at least one driving lug; and a plurality of second gear teeth positioned to engage the at least one latching lug.

4. The actuator of claim 3, wherein the plurality of first gear teeth are configured to rotate the latching ring a first amount upon engagement with the at least one driving lug and the plurality of second gear teeth are configured to rotate the latching ring a second amount upon engagement with the at least one latching lug.

5. The actuator of claim 4, wherein the first amount is greater than the second amount.

6. The actuator of claim 5, wherein the first amount is about 35 degrees and the second amount is about 10 degrees.

7. The actuator of claim 4, wherein the at least one driving lug is a plurality of driving lugs and the at least one latching lug is a plurality of latching lugs.

8. The actuator of claim 7, wherein the plurality of driving lugs are two equally spaced driving lugs and the plurality of latching lugs are two equally spaced latching lugs.

9. The actuator of claim 7, wherein depressing the plunger axially into the actuator body causes the plurality of latching lugs to slide out of the plurality of slots and the plurality of driving lugs to contact the plurality of first gear teeth to rotate the latching ring the first amount.

10. The actuator of claim 9, wherein releasing the plunger after the plurality of latching lugs slide out of the plurality of slots causes the plurality of latching lugs to engage the plurality of second gear teeth to rotate the latching ring the second amount and engage a holding feature of the plurality of second gear teeth when going from the cable release position to the cable pull position.

11. The actuator of claim 10, wherein the holding feature holds the latching lug to produce the cable pull position.

12. The actuator of claim 7, wherein depressing the plunger axially into the actuator body causes the plurality of latching lugs to disengage from the holding feature and the plurality of driving lugs to contact the plurality of first gear teeth to rotate the latching ring the first amount.

13. The actuator of claim 12, wherein releasing the plunger after the plurality of driving lugs rotate the latching ring the first amount causes the plurality of latching lugs to engage the plurality of second gear teeth to rotate the latching ring the second amount and be aligned with and received by the plurality of slots when going from the cable pulling position to the cable release position.

14. The actuator of claim 1, wherein the plunger has an axis and the at least one driving lug and the at least one latching lug have a longitudinal extent that are aligned with the plunger axis.

15. The actuator of claim 1, wherein the actuator body includes an opening that is sized and shaped to receive the cable housing and the cable.

16. The actuator of claim 15, wherein the cable housing includes a curved surface for guiding the cable into the hollow interior of the actuator body.

17. The actuator of claim 15, wherein the cable housing, when attached to the actuator body, interfaces with the plunger to prevent the plunger from rotating relative to the actuator body.

18. The actuator of claim 17, wherein the actuator body and cable housing are a two-piece construction.

* * * * *